United States Patent [19]

Whang

[11] Patent Number: 5,702,636

[45] Date of Patent: Dec. 30, 1997

[54] GEL-GLASS DISPERSED LIQUID CRYSTALS

[75] Inventor: Wha-Tzong Whang, Hsinchu, Taiwan

[73] Assignee: National Science Council, Taipei, Taiwan

[21] Appl. No.: 530,895

[22] Filed: Sep. 20, 1995

[51] Int. Cl.$^6$ .................................................. C09K 19/52
[52] U.S. Cl. ........................... 252/299.01; 428/1; 349/91
[58] Field of Search ................... 252/299.5; 428/1; 349/91

[56] References Cited

U.S. PATENT DOCUMENTS 5,449,733  9/1995  Zyss et al. ................................. 528/9

OTHER PUBLICATIONS

Chang et al., "Electrooptic Characteristics of Amino-Gel-–Glass–Dispersed Liquid Crystal and Its Matrix Formation," *Jpn. J. Appl. Phys.*, vol. 34, Part 1, No. 4A, pp. 1888–1894 (1995).

Levy et al., "Preparation of Electro–Optical Active Liquid Crystal Microdomains by the Sol–Gel Process," *Materials Letters*, vol. 10, No. 9,10, pp. 470–475 (1991).

Haruvy et al., "Supported Sol–Gel Thin–Film Glasses Embodying Laser Dyes. 1. A New Fast Method for the Preparation of Optically Clear Polysiloxane Thin–Film Glasses," *Chem. Mater.*, vol. 3, No. 3, pp. 501–507 (1991).

Oton et al., "Glass Dispersed Liquid Crystals," *Liquid Crystals*, vol. 10, No. 5, pp. 733–739 (1991).

*Primary Examiner*—Mark Nagumo
*Attorney, Agent, or Firm*—Birch, Stewart, Kolasch & Birch, LLP

[57] ABSTRACT

The present invention provides a gel-glass dispersed liquid crystal. The raw material composition of the gel-glass dispersed liquid crystal includes a three functionally substituted silane, two functionally substituted silane, a metal alkoxide and a liquid crystal. At least one of the non-hydrolyzable moieties of the three functionally substituted silane, two functionally substituted silane and metal alkoxide has at least one amino group or a reactive functional group. The refractive index of the oxide of the metal is not less than 1.52. The obtained gel-glass dispersed liquid crystal has good film integrity and flexibility and a low operation voltage.

27 Claims, No Drawings

GEL-GLASS DISPERSED LIQUID CRYSTALS

BACKGROUND OF THE INVENTION

1. Field of the Invention

The present invention relates to a gel-glass dispersed liquid crystal and the raw material composition thereof, and more particularly relates to a raw material composition of a gel-glass dispersed liquid crystal, including a three functionally substituted silane, two functionally substituted silane and a metal alkoxide. At least one of the non-hydrolyzable moieties of the three functionally substituted silane, two functionally substituted silane and metal alkoxide has at least one amino group or a reactive functional group, and the refractive index of the oxide of the metal is not less than 1.52.

2. Description of the Prior Art

Liquid crystals can switch from a light scattering state to a transparent state upon application of an electric field. In the off-state (no applied field), the incident light is multiply scattered by the microdroplets of the liquid crystal, thus the liquid crystal is opaque. In the on-state (under an electric field), the directors of the liquid crystal are reoriented along the director of the field, thus the liquid crystal is transparent. Due to such properties, liquid crystal displays have been widely applied in watches, instruments, portable televisions, portable computers, projection screens of high definition televisions (HDTVs), liquid crystal light valves and light shutters.

Recently, gel-glass dispersed liquid crystals (GDLCs) have become the focus of research. Sol-gel processes are used to trap liquid crystal droplets into gel-glass matrices. For example, Oton et al. (Liquid Crystal, 10(5), 733(1991)) and Levy et al. (Material Letters, 10(9, 10), 470(1991)) disclose a sol-gel process for producing GDLCs, which involves subjecting a gel-glass matrix precursor and a liquid crystal to hydrolysis and condensation to form a sol-gel glass dispersed liquid crystal. The gel-glass matrix precursor used is a four functionally substituted silane or a mixture of a four functionally substituted silane and three functionally substituted silane. The substituted group is $C_2H_5O-$ or $CH_3COO-$.

The Oton et al. and Levy et al. GDLCs suffer from two problems. First, since the refractive index of the glass matrix and that of the liquid crystal differs greatly (the refractive index of the glass matrix is about 1.43, while the refractive index of the liquid crystal is about 1.52), the GDLC obtained has low transmittance in the on-state, only 10–20%. Second, the applied voltage for switching the GDLC from the off-state to the on-state (called operation voltage) is too high, for example, with a 20 μm thickness GDLC, the operation voltage is 175 V.

Haruvy and Webber (Chemical Material, 3, 501(1991)) report that the film integrity of GDLCs can be improved by introducing a three functionally substituted silane. Acid, ammonia water or methylamine which is a conventionally used catalyst serves to catalyze the sol-gel process. Although the resulting GDLC has good film integrity, its strength resistance is poor and the GDLC cracks easily upon being subjected to a hardness test.

SUMMARY OF THE INVENTION

Therefore, it is an object of the present invention to solve the above-mentioned problems and to provide a gel-glass dispersed liquid crystal, which has low off-state transmittance, high on-state transmittance, low operation voltage, good strength resistance, good film integrity and short gelation time.

To achieve the above object, the gel-glass dispersed liquid crystal of the present invention is obtained from hydrolysis and condensation of a raw material composition of the gel-glass dispersed liquid crystal. The raw material composition of the gel-glass dispersed liquid crystal includes:

(a) 0–30 wt % of a four functionally substituted silane selected from the group consisting of $Si(OR^1)_4$ and $Si(OOCR^2)_4$;

(b) 0–60 wt % of a three functionally substituted silane selected from the group consisting of $R^3Si(OR^1)_3$ and $R^3Si(OOCR^2)_3$;

(c) 3–70 wt % of a two functionally substituted silane selected from the group consisting of $R^4R^5Si(OR^1)_2$ and $R^4R^5Si(OOC^2)_2$;

(d) 0–30 wt % of a metal alkoxide $(R^6)_mM(OR^7)_n$;

(e) 10–80 wt % of a liquid crystal; and (f) 0–30 wt % of additives;

wherein each of $R^1$, $R^2$ and $R^7$ is an aliphatic group having not more than 7 carbon atoms, each of $R^3$, $R^4$, $R^5$ and $R^6$ is selected from the group consisting of an aliphatic group, aromatic group, substituted aliphatic group, substituted aromatic group, polymer moiety and substituted polymer moiety, wherein each of the aliphatic group, aromatic group, substituted aliphatic group and substituted aromatic group has not more than 24 carbon atoms, each of the polymer moiety and substituted polymer moiety has a molecular weight of not more than 10,000, the substituted group contained in the substituted aliphatic group, substituted aromatic group and substituted polymer moiety is an amino group or a reactive functional group, and wherein M is a metal atom, wherein the refractive index of the oxide of the metal atom is not less than 1.52, m is an integer between 0 and 4, n is an integer between 2 and 6, the additives are capable of improving the function and characteristics of the gel-glass dispersed liquid.

According to an aspect of the invention, the raw material composition of the gel-glass dispersed liquid crystal includes a two functionally substituted silane.

According to the second aspect of the invention, the raw material composition of the gel-glass dispersed liquid crystal includes a metal alkoxide, in which the refractive index of the oxide of the metal is not less than 1.52.

According to the third aspect of the invention, at least one of the non-hydrolyzable moieties of the three functionally substituted silane, two functionally substituted silane and metal alkoxide contained in the raw material composition of the gel-glass dispersed liquid crystal has at least one amino group or a reactive functional group.

DETAILED DESCRIPTION OF THE INVENTION

The gel-glass matrix for the gel-glass dispersed liquid crystal (hereinafter abbreviated as GDLC) of the present invention is prepared by the sol-gel method. The method involves subjecting, in the presence of water, the silicon alkoxide, i.e., $Si(OR^1)_4$ and $Si(OOCR^2)_4$ and the metal alkoxide $(R^6)_mM(OR^7)_n$ to hydrolysis in order to obtain silicon alcohols and metal alcohols, which are in turn subjected to condensation to form a gel-glass matrix with a network structure. The reactions as mentioned above are outlined as follows:

$$Si(OR^1)_4 + 4H_2O \rightarrow Si(OH)_4 + 4 R^1OH$$

$$Si(OOCR^2)_4 + 4 H_2O \rightarrow Si(OH)_4 + 4 R^2COOH$$

$$(R^6)_m M(OR^7)_n + n H_2O \rightarrow (R^6)_m M(OH)_n + n R^7OH$$

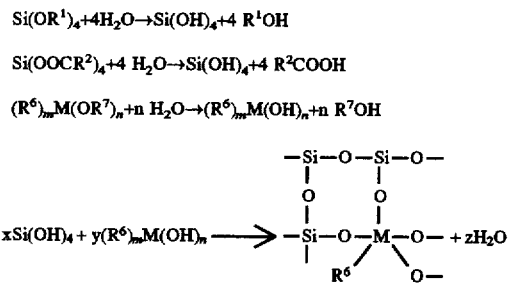

wherein each of $R^1$, $R^2$ and $R^7$ is an aliphatic group having not more than 7 carbon atoms;

$R^6$ is selected from the group consisting of an aliphatic group, aromatic group, substituted aliphatic group, substituted aromatic group, polymer moiety and substituted polymer moiety;

wherein each of the aliphatic group, aromatic group, substituted aliphatic group and substituted aromatic group has not more than 24 carbon atoms, and each of the polymer moiety and substituted polymer moiety has a molecular weight of not more than 10,000; and wherein M is a metal atom, wherein the refractive index of the oxide of the metal atom is not less than 1.52;

m is an integer between 0 and 4;

n is an integer between 2 and 6; and each of x, y and z is an integer larger than 0.

The raw material composition of the gel-glass dispersed liquid crystal includes a four functionally substituted silane, a three functionally substituted silane, a two functionally substituted silane, a metal alkoxide, a liquid crystal and additives.

The four functionally substituted silane suitable for use in the present invention is represented by the formula of $Si(OR^1)_4$ or $Si(OOCR^2)_4$. The three functionally substituted silane suitable for use in the present invention is represented by $R^3Si(OR^1)_3$ or $R^3Si(OOCR^2)_3$. The two functionally substituted silane suitable for use in the present invention is represented by $R^4R^5Si(OR^1)_2$ or $R^4R^5Si(OOCR^2)_2$.

As to the R group, each of $R^1$ and $R^2$ is an aliphatic group having not more than 7 carbon atoms, and each of $R^3$, $R^4$ and $R^5$ is selected from the group consisting of an aliphatic group, aromatic group, substituted aliphatic group, substituted aromatic group, polymer moiety and substituted polymer moiety. Each of the aliphatic group, aromatic group, substituted aliphatic group and substituted aromatic group has not more than 24 carbon atoms, and each of the polymer moiety and substituted polymer moiety has a molecular weight of not more than 10,000. The substituted group contained in the substituted aliphatic group, substituted aromatic group and substituted polymer moiety is an amino group or a reactive functional group.

Conventionally, to shorten the time for preparing GDLCs, an acidic or basic solution such as ammonia water, formamide or methylamine is frequently added to the raw material composition of a GDLC to catalyze the sol-gel process. However, in the present invention, the above catalysts have not been used. The reason why we do not use the conventionally used catalysts is because that although the above catalysts do shorten the preparation time, since they are volatile, during the GDLC preparation process, the catalyst will evaporate, thus the reaction rate is not easily controlled and the vapor is hazardous to the operators. Also, the resultant GDLC will have unacceptably large pores.

Furthermore, according to the preceding description, we know that Haruvy and Webber (Chemical Material, 3, 501 (1991)) use acid, ammonia water or methylamine to catalyze the reaction. Also, a three functionally substituted silane is introduced to improve the film integrity of GDLCs. Results show that although the resulting GDLC has good film integrity, the strength resistance is poor and the GDLC cracks easily upon being subjected to a hardness test. This proves that smaller molecules such as ammonia water, formamide and methylamine are not suitable catalysts for preparing GDLCs.

Alternatively, in the present invention, a three functionally substituted silane, a two functionally substituted silane or a metal alkoxide, wherein at least one of the non-hydrolyzable moieties of which has at least one amino group or a reactive functional group, is added into the raw material composition of the GDLC to accelerate the hydrolysis and condensation during the sol-gel process. The resultant GDLC has good film integrity and flexibility and does not crack easily upon being subjected to a hardness test.

The reactive functional group can undergo hydrolysis and condensation and is selected from the group consisting of

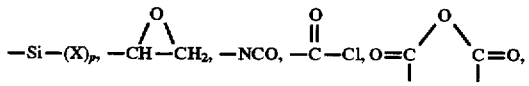

or the reactive functional group can form a linkage at room temperature, at an elevated temperature or upon exposure to light, wherein p is an integer between 1 and 3, X is selected from the group consisting of OOCR, OR, H, Cl, Br, I and F; and wherein R is an aliphatic group having not more than 7 carbon atoms.

The most notable feature resulted from the introduction of amino group or reactive functional group resides in that the operation voltage of the resultant GDLC is greatly lowered and can be determined. For example, the operation voltage of the GDLC obtained by Oton et al. with a 20 μm thickness, is 175 V. While in the present invention, the 12.5 μm thick GDLC film obtained from the raw material of 3-aminopropyltrimethoxysilane and titanium ethoxide has an operation voltage of 58 V (see Example 11), and the 12.5 μm thick GDLC film obtained from the raw material of N-[3-trimethoxysilylpropyl]ethylene-diamine and titanium ethoxide has an operation voltage of 34 V (see Example 10). The presence of amino group on the non-hydrolyzable moiety of the silicon alkoxide is deemed to be the contributing factor to the low operation voltage required by the resultant GDLC.

The four functionally substituted silane suitable for use in the present invention includes tetramethoxysilane, tetraethoxysilane and tetrapropoxysilane.

The non-hydrolyzable moieties of the three functionally substituted silane suitable for use in the present invention may or may not contain an amino group and may or may not contain a reactive functional group defined as above. Examples of the three functionally substituted silane are methyltriethoxysilane, trimethoxypropylsilane, (3-chloropyl)trimethoxysilane, N-[3-trimethoxysilylpropyl]-ethylenediamine and 3-aminopropyltrimethoxysilane.

The non-hydrolyzable moieties of the two functionally substituted silane suitable for use in the present invention may or may not contain an amino group and may or may not contain a reactive functional group defined as above. A preferred example of the two functionally substituted silane is 3-(diethoxymethylsilyl)propylamine.

In order to obtain a better result, the total weight of the amino group-containing silanes of components (b) and (c) or the total weight of the reactive functional group-containing silanes of components (b) and (c) is preferably not lower than 5% of the total weight of components (a), (b) and (c).

In the present invention, the addition of the two functionally substituted silane can further lower the operation voltage of the GDLC. For example, the GDLC obtained from the raw material containing 3-(diethoxymethylsilyl)propylamine (which is a two functionally substituted silane) has an operation voltage only of 4 V (see Example 22). The low operation voltage results in lower electricity consumption to drive the GDLC. Furthermore, the introduction of the two functionally substituted silane will increase the amount of the linear part in the network structure of the GDLC, thus making the GDLC more flexible.

Generally speaking, in the GDLC, the larger difference between the refractive index of the matrix and that of the liquid crystal leads to better on-state transmittance. A commonly used liquid crystal has a refractive index of above 1.49, however, the refractive index of a glass matrix obtained from silicon alkoxides only containing aliphatic groups can hardly reach 1.48. One way to enhance the refractive index of the glass matrix is to introduce aromatic groups onto the non-hydrolyzable moieties of the silicon alkoxides. Alternatively, the addition of a metal alkoxide to the raw materials of the gel-glass matrix is also effective.

The metal alkoxide suitable for use in the present invention meets the requirement that the refractive index of the oxide of the metal atom be not less than 1.52. The addition of such a metal alkoxide can thus enhance the refractive index of the glass matrix to match that of the liquid crystal.

The metal alkoxide can be represented by $(R^6)_m M(OR^7)_n$, wherein M is a metal atom, $R^6$ is selected from the group consisting of an aliphatic group, aromatic group, substituted aliphatic group, substituted aromatic group, polymer moiety and substituted polymer moiety, $R^7$ is an aliphatic group having not more than 7 carbon atoms, m is an integer between 0 and 4 and n is an integer between 2 and 6. Each of the aliphatic group, aromatic group, substituted aliphatic group and substituted aromatic group has not more than 24 carbon atoms, and each of the polymer moiety and substituted polymer moiety has a molecular weight of not more than 10,000. The substituted group contained in the substituted aliphatic group, substituted aromatic group and substituted polymer moiety is amino group or a reactive functional group defined as above.

The metal atom (M) of the metal alkoxide $(R^6)_m M(OR^7)_n$ can be lead, tantalum, barium, calcium, strontium, lanthanum, yttrium, indium, tin, iridium, aluminum, titanium, niobium, zirconium, zinc or germanium. The most preferred example is titanium, and the metal alkoxide is preferably titanium ethoxide.

The raw materials of the GDLC of the present invention can further include one or more additives which are capable of improving the function and characteristics of the GDLC, for example, lowering the operation voltage and enhancing the on-state transmittance of the GDLC. The additives suitable for use include transparent polymers, transparent oligomers, transparent polymer precursors, substituted transparent polymers, substituted transparent oligomers, and substituted transparent polymer precursors. Upon the addition of such polymer-type additives, a composite glass-dispersed liquid crystal results.

The substituted group contained in the substituted transparent polymers, substituted transparent oligomers, and substituted transparent polymer precursors is amino group or a reactive functional group, wherein the reactive functional group can undergo hydrolysis and condensation and is selected from the group consisting of

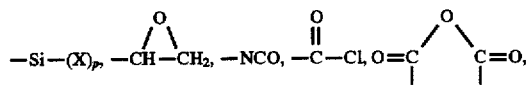

or the reactive functional group can form a linkage at room temperature, at an elevated temperature or upon exposure to light,
wherein p is an integer between 1 and 3;
X is selected from the group consisting of OOCR, OR, H, Cl, Br, I and F; and
wherein R is an aliphatic group having not more than 7 carbon atoms.

The liquid crystals suitable for use in the present invention include nematic liquid crystals, smectic liquid crystals, cholesteric liquid crystals and ferroelectric liquid crystals. The driving force to reorient the resultant GDLC can be an electric field or magnetic field or any other suitable field according to the liquid crystal used.

The following specific examples are intended to demonstrate this invention more fully without acting as a limitation upon its scope, since numerous modifications and variations will be apparent to those skilled in the art.

EXAMPLES

Table I below shows the abbreviations of alkoxides used in the following examples.

TABLE I

Abbreviations of alkoxides used in the present invention

| No. | silicon alkoxide | Chemical formula | Abbreviation |
|---|---|---|---|
| 1 | Methyltriethoxysilane | $(C_2H_5O)_3SiCH_3$ | MTEOS |
| 2 | Tetraethylorthosilicate (or Tetraethoxysilane) | $Si(OC_2H_5)_4$ | TEOS |
| 3 | Trimethoxypropylsilane | $(CH_3O)_3Si(CH_2)_2CH_3$ | TMOPS |
| 4 | N-[3-Trimethoxysilylpropyl]ethylenediamine | $(CH_3O)_3Si(CH_2)_3NHCH_2CH_2NH_2$ | TMOSPED |
| 5 | (3-Chloropyl)trimethoxysilane | $(CH_3O)_3Si(CH_2)_3Cl$ | CLTMOS |
| 6 | 3-Aminopropyltrimethoxysilane | $(CH_3O)_3Si(CH_2)_3NH_2$ | APTMOS |
| 7 | 3-(Diethoxymethylsilyl)propylamine | $(C_2H_5O)_2Si(CH_3)(CH_2)_3NH_2$ | DEOMSP |
| 8 | Titanium ethoxide | $Ti(OC_2H_5)_4$ | TIE |

PART I: Preparation of gel-glass matrix

Example 1

1.000 g of TMOSPED and 0.220 g of TIE were homogeneously mixed. After vigorous stirring, the mixture was cast on a Teflon disk and placed in a humidity chamber for temperature and humidity control until the formation of gel-glass occurred. The hardness of the gel-glass was measured according to the ASTM-D2240 Shore D method. The refractive index of the gel-glass was measured using Abbe refractometer with a sodium light source (589 nm). The characteristics of the gel-glass matrix obtained are summarized in Table II.

Example 2

The same procedures as described in Example 1 were employed except that the raw materials of the gel-glass used were 1.000 g of APTMOS and 0.212 g of TIE. The characteristics of the gel-glass matrix obtained are summarized in Table II.

Example 3

The same procedures as described in Example 1 were employed except that the raw materials of the gel-glass used were 0.300 g of TEOS, 0.700 g of DEOMSP and 0.176 g of TIE. The characteristics of the gel-glass matrix obtained are summarized in Table II.

Example 4

The same procedures as described in Example 1 were employed except that the raw materials of the gel-glass used were 0.300 g of MTEOS, 0.700 g of DEOMSP and 0.176 g of TIE. The characteristics of the gel-glass matrix obtained are summarized in Table II.

Example 5

The same procedures as described in Example 1 were employed except that the raw materials of the gel-glass used were 0.300 g of TMOPS, 0.700 g of DEOMSP and 0.176 g of TIE. The characteristics of the gel-glass matrix obtained are summarized in Table II.

Example 6

The same procedures as described in Example 1 were employed except that the raw materials of the gel-glass used were 0.300 g of CLTMOS, 0.700 g of DEOMSP and 0.176 g of TIE. The characteristics of the gel-glass matrix obtained are summarized in Table II.

Example 7

The same procedures as described in Example 1 were employed except that the raw materials of the gel-glass used were 0.300 g of TMOSPED, 0.700 g of DEOMSP and 0.176 g of TIE. The characteristics of the gel-glass matrix obtained are summarized in Table II.

Example 8

The same procedures as described in Example 1 were employed except that the raw materials of the gel-glass used were 0.600 g of APTMOS, 0.400 g of DEOMSP and 0.136 g of TIE. The characteristics of the gel-glass matrix obtained are summarized in Table II.

Example 9

The same procedures as described in Example 1 were employed except that the raw materials of the gel-glass used were 0.600 g of APTMOS, 0.400 g of DEOMSP and 0.176 g of TIE. The characteristics of the gel-glass matrix obtained are summarized in Table II.

Comparative Example 1

1.000 g of TEOS was homogeneously mixed with 1.000 g of ethanol (99.5%) and stirred for several minutes. 0.136 g of TIE was dropwisely added to the silicon alkoxide solution in a dry glove box. After vigorous stirring, the mixture was cast on a Teflon disk and placed in a humidity chamber for temperature and humidity control until the formation of gel-glass occurred. The characteristics of the gel-glass matrix obtained are summarized in Table II.

Comparative Example 2

The same procedures as described in Comparative Example 1 were employed except that the raw materials of the gel-glass used were 1.000 g of MTEOS and 0.220 g of TIE. The characteristics of the gel-glass matrix obtained are summarized in Table II.

Comparative Example 3

The same procedures as described in Comparative Example 1 were employed except that the raw materials of the gel-glass used were 1.000 g of TMOPS and 0.220 g of TIE. The characteristics of the gel-glass matrix obtained are summarized in Table II.

Comparative Example 4

The same procedures as described in Comparative Example 1 were employed except that the raw materials of the gel-glass used were 1.000 g of CLTMOS and 0.220 g of TIE. The characteristics of the gel-glass matrix obtained are summarized in Table II.

PART II: Preparation of GDLC

Example 10

Liquid crystal E7 (purchased from Merck) was added to the gel-glass matrix solution of Example 1 and then stirred at 40° C. E7 was in a quantity sufficient to provide a mixture containing 15 wt % of E7, based on the total weight of the gel-glass matrix and E7. The mixture was cast on a cleaned STN-grade ITO (indium tin oxide) glass (120 Ωcm/□) for 20 minutes. A second ITO glass was placed on the surface of the GDLC to form a sandwich device with a 12.5 μm mylar spacer under ambient conditions, and then was left for one day. This device was then placed in an oven at 60° C. for two days.

The electrooptic characteristics of the GDLC obtained, including initial voltage, operation voltage and response time, were measured using a He-Ne laser (632.8 nm) incorporating an optical lens and detectors and an ac power source with a square waveform at a frequency of 1 kHz. The results are summarized in Table III.

Example 11

The same procedures described in Example 10 were employed except that E7 was added to the gel-glass matrix solution of Example 2 and E7 was in a quantity sufficient to provide a mixture containing 15 wt % of E7, based on the total weight of the gel-glass matrix and E7. The results are summarized in Table III.

Example 12

The same procedures described in Example 10 were employed except that E7 was added to the gel-glass matrix solution of Example 3 and E7 was in a quantity sufficient to provide a mixture containing 50 wt % of E7, based on the total weight of the gel-glass matrix and E7. The results are summarized in Table III.

Examples 13–14

The gel-glass matrix solution of Example 4 was divided into two portions, to each of which E7 was added and then stirred at 40° C. respectively. For the two portions, E7 was in a quantity sufficient to provide a mixture containing 30 wt % and 50 wt % of E7 respectively, based on the total weight of the gel-glass matrix and E7. The rest of the procedures were the same as Example 10. The results are summarized in Table III.

Example 14

The same procedures described in Example 10 were employed except that E7 was added to the gel-glass matrix solution of Example 4 and E7 was in a quantity sufficient to provide a mixture containing 50 wt % of E7, based on the total weight of the gel-glass matrix and E7. The results are summarized in Table III.

Example 15

The same procedures described in Example 10 were employed except that E7 was added to the gel-glass matrix solution of Example 5 and E7 was in a quantity sufficient to provide a mixture containing 50 wt % of E7, based on the total weight of the gel-glass matrix and E7. The results are summarized in Table III.

Example 16

The same procedures described in Example 10 were employed except that E7 was added to the gel-glass matrix solution of Example 6 and E7 was in a quantity sufficient to provide a mixture containing 50 wt % of E7, based on the total weight of the gel-glass matrix and E7. The results are summarized in Table III.

Examples 17–19

The gel-glass matrix solution of Example 7 was divided into three portions, to each of which was added with E7 and then stirred at 40° C. respectively. For the three portions, E7 was in a quantity sufficient to provide a mixture containing 15 wt %, 30 wt % and 50 wt % of E7 respectively, based on the total weight of the gel-glass matrix and E7. The rest of the procedures were the same as Example 10. The results are summarized in Table III.

Examples 20–22

The gel-glass matrix solution of Example 8 was divided into three portions, to each of which E7 was added and then stirred at 40° C. respectively. For the three portions, E7 was in a quantity sufficient to provide a mixture containing 15 wt %, 30 wt % and 50 wt % of E7 respectively, based on the total weight of the gel-glass matrix and E7. The rest of the procedures were the same as Example 10. The results are summarized in Table III.

Example 23

The same procedures described in Example 10 were employed except that E7 was added to the gel-glass matrix solution of Example 9 and E7 was in a quantity sufficient to provide a mixture containing 50 wt % of E7, based on the total weight of the gel-glass matrix and E7. The results are summarized in Table III.

Comparative Example 5–8

Ethanol was removed from each of the gel-glass matrix solution of Comparative Examples 1–4 under vacuum. Afterwards, E7 was added to each of the resulting four gel-glass matrix solutions respectively and then stirred at 40° C. For each of the four portions, E7 was in a quantity sufficient to provide a mixture containing 15 wt % of E7 respectively, based on the total weight of the gel-glass matrix and E7. The rest of the procedures were the same as Example 10. The results are summarized in Table III.

Referring now to Table II, comparing Examples 3, 4, 5 and 6 with Comparative Examples 1, 2, 3 and 4, respectively, it is obvious that with the addition of DEOMSP (a two functionally substituted silane), the resultant glass matrix has enhanced film integrity and flexibility and does not crack under ambient conditions.

Further comparing Examples 3, 4, 5 and 6 with Examples 7, 8 and 9, it is found that with the introduction of TMOSPED or APTMOS, both of which is an amino-substituted silane, the resultant glass matrix is much more flexible.

Referring now to Table III, comparing Examples 12, 13 plus 14, 15 and 16 with Comparative Examples 5, 6, 7 and 8, respectively, it is found that with the addition of DEOMSP (a two functionally substituted silane), the operation voltage of the resultant GDLC is lowered to a value which can be determined. The lowest operation voltage is obtained when the raw materials of the GDLC used are APTMOS, DEOMSP and TIE, that is, 3-aminopropyltrimethoxysilane, 3-(diethoxymethylsilyl)propylamine and titanium ethoxide (see Example 22).

TABLE II

Characteristics of gel-glass matrices

| Example No. | Composition | Weight ratio in part | Film integrity | Hardness (Shore-D) | Refractive index |
|---|---|---|---|---|---|
| Example 1 | TMOSPED/TIE | 82.0/18.0 | transparent and crack-free for a long time | Fragile | 1.5298 |
| Example 2 | APTMOS/TIE | 82.5/17.5 | same as above | Fragile | 1.5290 |
| Example 3 | TEOS/DEOMSP/TIE | 25.5/59.5/15.0 | same as above | 27 | 1.5210 |
| Example 4 | MTEOS/DEOMSP/TIE | 25.5/59.5/15.0 | same as above | 25 | 1.5186 |
| Example 5 | TMOPS/DEOMSP/TIE | 25.5/59.5/15.0 | same as above | 27 | 1.5189 |
| Example 6 | CLTMOS/DEOMSP/TIE | 25.5/59.5/15.0 | same as above | 30 | 1.5220 |
| Example 7 | TMOSPED/DEOMSP/TIE | 25.5/59.5/15.0 | same as above | 18 | 1.5190 |
| Example 8 | APTMOS/DEOMSP/TIE | 52.8/35.2/12.0 | same as above | 15 | 1.5211 |
| Example 9 | APTMOS/DEOMSP/TIE | 51.0/34.0/15.0 | same as above | 17 | — |

TABLE II-continued

Characteristics of gel-glass matrices

| Example No. | Composition | Weight ratio in part | Film integrity | Hardness (Shore-D) | Refractive index |
|---|---|---|---|---|---|
| Comp. Example 1 | TEOS/TIE | 88/12 | cracked under ambient conditions in a few days | — | 1.5264 |
| Comp. Example 2 | MTEOS/TIE | 82/18 | same as above | — | 1.5227 |
| Comp. Example 3 | TMOPS/TIE | 82/18 | same as above | — | 1.5199 |
| Comp. Example 4 | CLTMOS/TIE | 82/18 | same as above | — | — |

TABLE III

Characteristics of gel-glass dispersed liquid crystals

| Example No. | Gel-glass matrix composition | Weight ratio in part | Liquid crystal (E7) added (wt %)[a] | Initial voltage (V) | Operation voltage (V) | Response time (ms) |
|---|---|---|---|---|---|---|
| Example 10 | TMOSPED/TIE | 82.0/18.0 | 15 | 18 | 34 | 4.2 |
| Example 11 | APTMOS/TIE | 82.5/17.5 | 15 | 12 | 58 | 6.5 |
| Example 12 | TEOS/DEOMSP/TIE | 25.5/59.5/15.0 | 50 | 6.5 | 16 | 9.4 |
| Example 13 | MTEOS/DEOMSP/TIE | 25.5/59.5/15.0 | 30 | 4.5 | 26 | 8.6 |
| Example 14 | MTEOS/DEOMSP/TIE | 25.5/59.5/15.0 | 50 | 4.5 | 11 | 8.9 |
| Example 15 | TMOPS/DEOMSP/TIE | 25.5/59.5/15.0 | 50 | 3.5 | 17 | 9.5 |
| Example 16 | CLTMOS/DEOMSP/TIE | 25.5/59.5/15.0 | 50 | 10 | 24 | 9.0 |
| Example 17 | TMOSPED/DEOMSP/TIE | 25.5/59.5/15.0 | 15 | 10.5 | 26 | 6.5 |
| Example 18 | TMOSPED/DEOMSP/TIE | 25.5/59.5/15.0 | 30 | 6 | 19 | 6.9 |
| Example 19 | TMOSPED/DEOMSP/TIE | 25.5/59.5/15.0 | 50 | 3.5 | 12 | 11.2 |
| Example 20 | APTMOS/DEOMSP/TIE | 52.8/35.2/12.0 | 15 | 12 | 23 | 6.5 |
| Example 21 | APTMOS/DEOMSP/TIE | 52.8/35.2/12.0 | 30 | 7 | 15 | 7.2 |
| Example 22 | APTMOS/DEOMSP/TIE | 52.8/35.2/12.0 | 50 | 2.5 | 4 | 18.6 |
| Example 23 | APTMOS/DEOMSP/TIE | 51.0/34.0/15.0 | 50 | 5.5 | 13 | 16.8 |
| Comp. Example 5 | TEOS/TIE | 88/12 | 15 | —[b] | —[b] | — |
| Comp. Example 6 | MTEOS/TIE | 82/18 | 15 | — | — | — |
| Comp. Example 7 | TMOPS/TIE | 82/18 | 15 | — | — | — |
| Comp. Example 8 | CLTMOS/TIE | 82/18 | 15 | — | — | — |

[a]Based on the total weight of the components, i.e., total weight of the gel-glass matrix and E7.
[b]could not be determined.

What is claimed is:

1. A gel-glass dispersed liquid crystal, which is prepared from the components of:
   (a) 0–30 wt % of a four functionally substituted silane selected from the group consisting of $Si(OR^1)_4$ and $Si(OOCR^2)_4$;
   (b) 0–60 wt % of a three functionally substituted silane selected from the group consisting of $R^3Si(OR^1)_3$ and $R^3Si(OOCR^2)_3$;
   (c) 3–70 wt % of a two functionally substituted silane selected from the group consisting of $R^4R^5Si(OR^1)_2$ and $R^4R^5Si(OOCR^2)_2$;
   (d) 0–30 wt % of a metal alkoxide $(R^6)_mM(OR^7)_n$;
   (e) 10–80 wt % of a liquid crystal; and
   (f) 0–30 wt % of additives;

wherein
   each of $R^1$, $R^2$ and $R^7$ is an aliphatic group having not more than 7 carbon atoms,
   each of $R^3$, $R^4$, $R^5$ and $R^6$ is selected from the group consisting of an aliphatic group, aromatic group, substituted aliphatic group, substituted aromatic group, polymer moiety and substituted polymer moiety, wherein
   each of the aliphatic group, aromatic group, substituted aliphatic group and substituted aromatic group has not more than 24 carbon atoms, each of the polymer moiety and substituted polymer moiety has a molecular weight of not more than 10,000, the substituted group contained in the substituted aliphatic group, substituted aromatic group and substituted polymer moiety is an amino group or a reactive functional group, which is capable of undergoing hydrolysis and condensation or is capable of forming a linkage at room temperature, at an elevated temperature or upon exposure to light, and wherein
   M is a metal atom, wherein the refractive index of the oxide of the metal atom is not less than 1.52 when measured at 589 nm,
   m is an integer between 0 and 4,
   n is an integer between 2 and 6, and
   the additives lower the operation voltage of the glass dispersed liquid crystal or enhance the on-state transmittance of the gel-glass dispersed liquid crystal.

2. The gel-glass dispersed liquid crystal as claimed in claim 1, wherein component (a) is $Si(OR^1)_4$.

3. The gel-glass dispersed liquid crystal as claimed in claim 1 wherein component (b) is $R^3Si(OR^1)_3$.

4. The gel-glass dispersed liquid crystal as claimed in claim 1, wherein component (c) is $R^4R^5Si(OR^1)_2$.

5. The gel-glass dispersed liquid crystal as claimed in claim 1, wherein the substituted group contained in the substituted aliphatic group, substituted aromatic group and substituted polymer moiety is an amino group.

6. The gel-glass dispersed liquid crystal as claimed in claim 1, wherein the substituted group contained in the substituted aliphatic group, substituted aromatic group and substituted polymer moiety is a reactive functional group, and the reactive functional group can undergo hydrolysis and condensation and is selected from the group consisting of

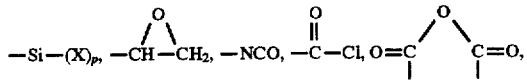

or the reactive functional group can form a linkage at room temperature, at an elevated temperature or upon exposure to light, wherein p is an integer between 1 and 3 and wherein if p is 1 or 2 the remaining valences of the Si are hydrocarbons;

X is selected from the group consisting of OOCR, OR, H, Cl, Br, I and F; and wherein R is an aliphatic group having not more than 7 carbon atoms.

7. The gel-glass dispersed liquid crystal as claimed in claim 1, wherein component (a) is selected from the group consisting of tetramethoxysilane, tetraethoxysilane and tetrapropoxysilane.

8. The gel-glass dispersed liquid crystal as claimed in claim 1, wherein component (b) is selected from the group consisting of methyltriethoxysilane, trimethoxypropylsilane, (3-chloropyl)trimethoxysilane, N-[3-trimethoxysilylpropyl]ethylenediamine and 3-aminopropyltrimethoxysilane.

9. The gel-glass dispersed liquid crystal as claimed in claim 8, wherein component (b) is N-[3-trimethoxysilylpropyl]ethylenediamine.

10. The gel-glass dispersed liquid crystal as claimed in claim 8, wherein component (b) is 3-aminopropyltrimethoxysilane.

11. The gel-glass dispersed liquid crystal as claimed in claim 1, wherein component (c) is 3-(diethoxymethylsilyl) propylamine.

12. The gel-glass dispersed liquid crystal as claimed in claim 1, wherein the total weight of the amino group-containing silanes of components (b) and (C) or the total weight of the reactive functional group-containing silanes of components (b) and (c) is not lower than 5% of the total weight of components (a), (b) and (C).

13. The gel-glass dispersed liquid crystal as claimed in claim 1, wherein the metal atom (M) in component (d) is selected from the group consisting of lead, tantalum, barium, calcium, strontium, lanthanum, yttrium, indium, tin, iridium, aluminum, titanium, niobium, zirconium, zinc and germanium.

14. The gel-glass dispersed liquid crystal as claimed in claim 13, wherein the metal is titanium.

15. The gel-glass dispersed liquid crystal as claimed in claim 14, wherein component (d) is titanium ethoxide.

16. The gel-glass dispersed liquid crystal as claimed in claim 1, wherein component (b) is N-[3-trimethoxysilylpropyl]ethylenediamine, component (c) is 3-(diethoxymethylsilyl)propylamine and component (d) is titanium ethoxide.

17. The gel-glass dispersed liquid crystal as claimed in claim 1, wherein component (b) is 3-aminopropyltrimethoxysilane, component (c) is 3-(diethoxymethylsilyl)-propylamine and component (d) is titanium ethoxide.

18. The gel-glass dispersed liquid crystal as claimed in claim 1, wherein the liquid crystal is selected from the group consisting of nematic liquid crystals, smectic liquid crystals, cholesteric liquid crystals and ferroelectric liquid crystals.

19. The gel-glass dispersed liquid crystal as claimed in claim 1, wherein the additives of component (f) are selected from the group consisting of transparent polymers, transparent oligomers, transparent polymer precursors, substituted transparent polymers, substituted transparent oligomers, and substituted transparent polymer precursors, wherein the substituted group contained in the substituted transparent polymers, substituted transparent oligomers and substituted transparent polymer precursors is an amino group or a reactive functional group.

20. The gel-glass dispersed liquid crystal as claimed in claim 19, wherein the substituted group contained in the substituted transparent polymers, substituted transparent oligomers and substituted transparent polymer precursors is an amino group.

21. The gel-glass dispersed liquid crystal as claimed in claim 19, wherein the substituted group contained in the substituted transparent polymers, substituted transparent oligomers and substituted transparent polymer precursors is a reactive functional group, and the reactive functional group can undergo hydrolysis and condensation and is selected from the group consisting of

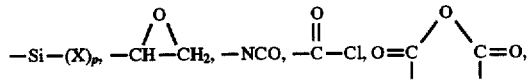

or the reactive functional group can form a linkage at room temperature, at an elevated temperature or upon exposure to light, wherein p is an integer between 1 and 3 and wherein if p is 1 or 2 the remaining valences of the Si are hydrocarbons;

X is selected from the group consisting of OOCR, OR, H, Cl, Br, I and F; and wherein R is an aliphatic group having not more than 7 carbon atoms.

22. A gel-glass dispersed liquid crystal, which is prepared from the components of:

(a) 0–30 wt % of a four functionally substituted silane selected from the group consisting of $Si(OR^1)_4$ and $Si(OOCR^2)_4$;

(b) 0–60 wt % of a three functionally substituted silane selected from the group consisting of $R^3Si(OR^1)_3$ and $R^3Si(OOCR^2)_3$;

(c) 3–70 wt % of a two functionally substituted silane selected from the group consisting of $R^4R^5Si(OR^1)_2$ and $R^4R^5Si(OOCR^2)_2$;

(d) 0–30 wt % of a metal alkoxide $(R^6)_mM(OR^7)_n$;

(e) 10–80 wt % of a liquid crystal; and (f) 0–30 wt % of additives; wherein each of $R^1$, $R^2$ and $R^7$ is an aliphatic group having not more than 7 carbon atoms, each of $R^3$, $R^4$, $R^5$ and $R^6$ is selected from the group consisting of an aliphatic group, aromatic group, substituted aliphatic group, substituted aromatic group, polymer moiety and substituted polymer moiety, wherein each of the aliphatic group, aromatic group, substituted aliphatic group and substituted aromatic group has not more than 24 carbon atoms, each of the polymer moiety and substituted polymer moiety has a molecular weight of not more than 10,000, the substituted group contained in the substituted aliphatic group, substituted aromatic group and substituted polymer moiety is an amino group, and wherein M is a metal atom, wherein the refractive index of the oxide of the metal atom is not less than 1.52 when measured at 589 nm, m is an integer between 0 and 4, n is an integer between 2 and 6, and the additives lower the operation voltage of the glass dispersed liquid crystal or enhance the on-state transmittance of the gel-glass dispersed liquid crystal.

23. A gel-glass dispersed liquid crystal, which is prepared from the components of:

(a) 0–30 wt % of a four functionally substituted silane selected from the group consisting of $Si(OR^1)_4$ and $Si(OOCR^2)_4$; (b) 0–60 wt % of a three functionally substituted silane selected from the group consisting of $R^3Si(OR^1)_3$ and $R^3Si(OOCR^2)_3$; (c) 3–70 wt % of a two functionally substituted silane selected from the group consisting of $R^4R^5Si(OR^1)_2$ and $R^4R^5Si(OOCR^2)_2$; (d) 0–30 wt % of a metal alkoxide $(R^6)_mM(OR^7)_n$; (e) 10–80 wt % of a liquid crystal; and (f) 0–30 wt % of additives;

wherein each of $R^1$, $R^2$ and $R^7$ is an aliphatic group having not more than 7 carbon atoms, each of $R^3$, $R^4$, $R^5$ and $R^6$ is selected from the group consisting of an aliphatic group, aromatic group, substituted aliphatic group, substituted aromatic group, polymer moiety and substituted polymer moiety, wherein each of the aliphatic group, aromatic group, substituted aliphatic group and substituted aromatic group has not more than 24 carbon atoms, each of the polymer moiety and substituted polymer moiety has a molecular weight of not more than 10,000, the substituted group contained in the substituted aliphatic group, substituted aromatic group and substituted polymer moiety is an amino group, at least one of $R^4$ and $R^5$ is an amino-substituted aliphatic group, and wherein M is a metal atom, wherein the refractive index of the oxide of the metal atom is not less than 1.52 when measured at 589 nm, m is an integer between 0 and 4, n is an integer between 2 and 6, and the additives lower the operation voltage of the glass dispersed liquid crystal or enhance the on-state transmittance of the gel-glass dispersed liquid crystal.

24. A gel-glass dispersed liquid crystal, which is prepared from the components of:

(a) 0–30 wt % of a four functionally substituted silane selected from the group consisting of $Si(OR^1)_4$ and $Si(OOCR^2)_4$;

(b) 0–60 wt % of a three functionally substituted silane selected from the group consisting of $R^3Si(OR^1)_3$ and $R^3Si(OOCR^2)_3$;

(c) 3–70 wt % of a two functionally substituted silane selected from the group consisting of $R^4R^5Si(OR^1)_2$ and $R^4R^5Si(OOCR^2)_2$;

(d) 0–30 wt % of a metal alkoxide $(R^6)_mM(OR^7)_n$;

(e) 10–80 wt % of a liquid crystal; and (f) 0–30 wt % of additives;

wherein each of $R^1$, $R^2$ and $R^7$ is an aliphatic group having not more than 7 carbon atoms, each of $R^3$, $R^4$, $R^5$ and $R^6$ is selected from the group consisting of an aliphatic group, aromatic group, substituted aliphatic group, and substituted aromatic group, wherein each of the aliphatic group, aromatic group, substituted aliphatic group and substituted aromatic group has not more than 24 carbon atoms, the substituted group contained in the substituted aliphatic group and substituted aromatic group is an amino group, at least one of $R^4$ and $R^5$ is an amino-substituted aliphatic group, and wherein M is a metal atom selected from the group consisting of lead, tantalum, barium, calcium, strontium, lanthanum, yttrium, indium, tin, iridium, aluminum, titanium, niobium, zirconium, zinc and germanium, m is an integer between 0 and 4, n is an integer between 2 and 6, and the additives lower the operation voltage of the glass dispersed liquid crystal or enhance the on-state transmittance of the gel-glass dispersed liquid crystal, and are selected from the group consisting of transparent polymers, transparent oligomers, transparent polymer precursors, substituted transparent polymers, substituted transparent oligomers, and substituted transparent polymer precursors.

25. A gel-glass dispersed liquid crystal, which is prepared from the components of:

(a) 0–30 wt % of a four functionally substituted silane of $Si(OR^1)_4$;

(b) 0–60 wt % of a three functionally substituted silane of $R^3Si(OR^1)_3$;

(c) 3–70 wt % of a two functionally substituted silane of $R^4R^5Si(OR^1)_2$;

(d) 0–30 wt % of a metal alkoxide $(R^6)_mM(OR^7)_n$;

(e) 10–80 wt % of a liquid crystal; and (f) 0–30 wt % of additives;

wherein each of $R^1$ and $R^7$ is an aliphatic group having not more than 7 carbon atoms, each of $R^3$, $R^4$, $R^5$ and $R^6$ is selected from the group consisting of an aliphatic group, and substituted aliphatic group, wherein each of the aliphatic group, and substituted aliphatic group has not more than 24 carbon atoms, the substituted group contained in the substituted aliphatic group is an amino group, at least one of $R^4$ and $R^5$ is an amino-substituted aliphatic group, and wherein M is a metal atom selected from the group consisting of lead, tantalum, barium, calcium, strontium, lanthanum, yttrium, indium, tin, iridium, aluminum, titanium, niobium, zirconium, zinc and germanium, m is an integer between 0 and 4, n is an integer between 2 and 6, and the additives lower the operation voltage of the glass dispersed liquid crystal or enhance the on-state transmittance of the gel-glass dispersed liquid crystal, and are selected from the group consisting of transparent polymers, transparent oligomers, transparent polymer precursors, substituted transparent polymers, substituted transparent oligomers, and substituted transparent polymer precursors.

26. A gel-glass dispersed liquid crystal, which is prepared from the components of:

(a) 0–30 wt % of a four functionally substituted silane selected from the group consisting of tetramethoxysilane, tetraethoxysilane and tetrapropoxysilane;

(b) 0–60 wt % of a three functionally substituted silane selected from the group consisting of methyltriethoxysilane, trimethoxypropylsilane, (3-chloropyl)-trimethoxysilane, N-[3-trimethoxysilylpropyl]ethylene-diamine and 3-aminopropyltrimethoxysilane;

(c) 3–70 wt % of a two functionally substituted silane of $R^4R^5Si(OR^1)_2$; (d) 0–30 wt % of a metal alkoxide $(R^6)_mM(OR^7)_n$; (e) 10–80 wt % of a liquid crystal; and (f) 0–30 wt % of additives;

wherein each of $R^1$ and $R^7$ is an aliphatic group having not more than 7 carbon atoms, each of $R^4$, $R^5$ and $R^6$ is selected from the group consisting of an aliphatic group and substituted aliphatic group, wherein each of the aliphatic group and substituted aliphatic group has not more than 24 carbon atoms, the substituted group contained in the substituted aliphatic group is an amino group, at least one of $R^4$ and $R^5$ is an amino-substituted aliphatic group, and wherein M is a metal atom selected from the group consisting of lead, tantalum, barium, calcium, strontium, lanthanum, yttrium, indium, tin, iridium, aluminum, titanium, niobium, zirconium, zinc and germanium, m is an integer between 0 and 4, n is an integer between 2 and 6, and the additives lower the operation voltage of the glass dispersed liquid crystal or enhance the on-state transmittance of the gel-glass dispersed liquid crystal, and are selected from the group consisting of transparent polymers, transparent oligomers, transparent polymer precursors, substituted transparent polymers, substituted transparent oligomers, and substituted transparent polymer precursors.

27. A gel-glass dispersed liquid crystal, which is prepared from the components of:

(a) 0–30 wt % of tetraethoxysilane;

(b) 0–60 wt % of a three functionally substituted silane selected from the group consisting of methyltriethoxysilane, trimethoxypropylsilane, (3-chloropyl)trimethoxysilane, N-[3-trimethoxysilylpropyl]ethylenediamine and 3-aminopropyltrimethoxysilane;

(c) 3–70 wt % of 3-(diethoxymethylsilyl)propylamine;

(d) 0–30 wt % of titanium ethoxide; and (e) 10–80 wt % of a liquid crystal.

* * * * *